United States Patent [19]
Cloetens et al.

[11] Patent Number: 5,210,529
[45] Date of Patent: May 11, 1993

[54] BIT FINDER CIRCUIT

[75] Inventors: Leon Cloetens, Hasselt; Didier Gonze, Marchienne-Au-Pont; Karel Adriaensen, Meerle, all of Belgium

[73] Assignee: Alcatel N.V., Amsterdam, Netherlands

[21] Appl. No.: 759,163

[22] Filed: Sep. 13, 1991

[30] Foreign Application Priority Data

Sep. 18, 1990 [EP] European Pat. Off. ........ 90870152.7

[51] Int. Cl.$^5$ ..................... H04Q 1/00; H01H 67/00; H04M 9/00
[52] U.S. Cl. ............................ 340/875.04; 340/825.9; 379/292
[58] Field of Search ............. 340/825.04, 826, 825.79, 340/825.80, 825.89, 825.9, 825.91, 825.92, 825.93; 379/290, 320, 422, 423, 231, 232, 335, 337, 291, 292; 370/53, 54, 60.1; 335/107, 108

[56] References Cited

U.S. PATENT DOCUMENTS 3,522,587  8/1970  Brown ........................... 340/825.03
3,557,317  1/1971  Porter .
4,351,985  9/1982  Schlichte et al. .................. 340/826

FOREIGN PATENT DOCUMENTS 2173617 10/1986 United Kingdom .

Primary Examiner—Donald J. Yusko
Assistant Examiner—R. Gray
Attorney, Agent, or Firm—Ware, Fressola, Van Der Sluys & Adolphson

[57] ABSTRACT

A circuit to find the first bit 0 or 1 in an m-bit input word from a start bit onwards, the positions of these bits being defined by an n-bit code. It includes a crosspoint matrix of m (4) rows and n (2) columns, each crosspoint including a change-over contact (ABC), with a make contact (AB) and a break contact (AC), and another make contact (AD). The rows of change-over contacts (ABC) are controlled by respective bits of the m-bit word and the break contacts (AC) of the change-over contacts (ABC) of each row are coupled to respective bits of the n-bit code identifying the bit of the m-bit word respectively controlling these break contacts. Furthermore, the make contacts (AB) of the change-over contacts (ABC) of a same column are connected in a closed loop, whilst the other make contacts (AD) of a same column are connected in a parallel to a same output terminal (IA, IB), the rows of these other make contacts being controlled by a single-row selection circuit (TR).

4 Claims, 2 Drawing Sheets

BIT FINDER CIRCUIT

BACKGROUND OF THE INVENTION

1. Field of the Invention

The present invention relates to a bit finder circuit for finding the first bit 0/1 in an m-bit input word from a start bit onwards and in a predetermined direction, the positions of said bits in said m-bit word being defined by an n-bit code.

2. Description of the Prior Art

Such a bit finder circuit is generally known in the art and provides the position of the first bit 0 or 1 of the m-bit word considered from the leftmost bit onwards. This position is generally defined by a decimal m-bit code so that a code translator is required to have this code translated in the n-bit code, e.g. with $m = 2^n$ if the n-bit code is the binary code. On the other hand, in certain cases it may be useful to find the first bit 0/1 of the m-bit word from the position of a bit which has just been processed onwards and not from the leftmost bit onwards.

SUMMARY OF THE INVENTION

An object of the present invention is to provide a bit finder circuit of the above type, but which directly provides the n-bit position code of the first bit 0/1 of the m-bit word considered from a selected bit position onwards.

According to the invention this object is achieved due to the fact that it includes a crosspoint matrix of m rows and n columns, each crosspoint including a change-over contact means, with a make contact means and a break contact means, and another make contact means, all contact means having a common terminal the rows of change-over contact means being controlled by respective bits of said m-bit word and the break contact means of the change-over contact means of each row being coupled to respective bits of the n-bit code identifying the bit of the m-bit word controlling these break contact means, and in that the make contact means of the change-over contact means of a same column are connected in series, whilst said other make contact means of a same column are connected in parallel to a same output terminal, the rows of said other make contact means being controlled by a single-row selection circuit.

Under the control of for instance the bits 1 of the m-bit word only the change-over contact means of the associated rows are operated so as to disconnect the n-bit identity codes of these rows and closing the make contact means thereof, whilst under the control of the single-row selection circuit the said other make contact means of the selected row are operated so as to connect the crosspoint terminals thereof to the output terminals. As a result, chains of contact means are formed from the break contact means of the first row, following the selected single-row and controlled by a bit 0 of the m-bit word, to the output terminals via the closed make contact means, so that the n-bit identity code of the first bit 1 row following the selected single-row directly appears at these output terminals.

DESCRIPTION OF THE DRAWINGS

The above mentioned and other objects and features of the invention will become more apparent and the invention itself will be best understood by referring to the following description of an embodiment taken in conjunction with the accompanying drawings wherein.

DESCRIPTION OF THE INVENTION

Figure 1:
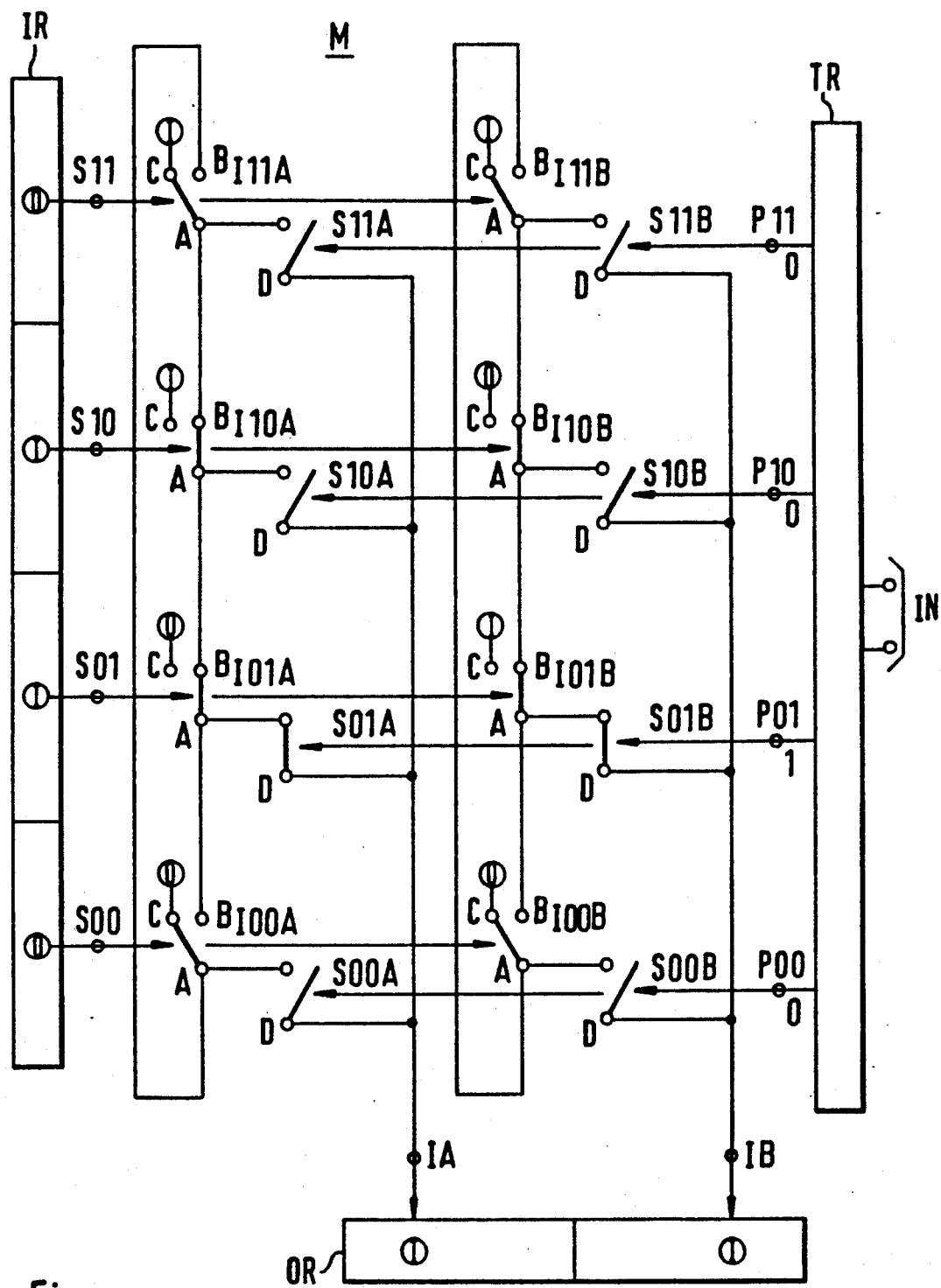
FIG. 1 represents a bit finder circuit FC according to the invention.

The bit finder circuit FC represented in FIG. 1 includes a 4-bit input word storage register IR with 4 outputs S00 to S11, a translator TR with 4 outputs P00 to P11, an identity output register OR with 2 inputs IA and IB, and a matrix M of 8 crosspoints.

The input register IR is able to store a 4-bit input word, the bit positions of this word being defined by the 2-bit identity codes 00, 01, 10 and 11 respectively.

The translator TR is adapted to translate any selected 2-bit identity bit position codes 00, 01, 10 or 11 applied at its input IN into a corresponding 4-bit decimal bit position code 0001, 0010, 0100 or 1000 respectively.

The identity output register OR is able to store the 2-bit identity bit position code provided at the inputs IA and IB.

The 8 crosspoints of the matrix M are arranged in 4 rows and 2 columns, each crosspoint including a change-over contact ABC, with a make contact AB and a break contact AC, and another make contact AD. All the contacts of a same crosspoint thus have a common terminal A. The 8 change-over contacts ABC are referenced to as I00A, I00B to I11A, I11B, whilst the 8 make contacts AD are indicated by S00A, S00B to S11A, S11B. These contacts are not all shown in their rest position.

The rows of change-over contacts ABC, i.e. I00A, I00B to I11A, I11B, are controlled by respective bits of the 4-bit input word stored in the input register IR through the outputs S00 to S11 thereof. The break contacts AC of the change-over contacts ABC of each row are coupled to respective bits of the 2-bit position code identifying the position of the bit of the 4-bit word controlling these break contacts. For instance, the break contacts I00A and I00B are coupled to respective bits 0 and 0 of the 2-bit bit position code 00 identifying the position of the first bit of the 4-bit word controlling these break contacts via the output S00 of IR.

The make contacts AB of each of the columns are connected in series in a closed loop, whilst the other make contacts AD of each column are connected to a same input terminal IA or IB of the output register OR. The rows of such other make contacts AD are controlled via respective ones of the outputs P00 to P11 of the translator TR, i.e. by the 4-bit decimal bit position code 0001 to 1000 which may be provided at these outputs.

The above described bit finder circuit is adapted to find the first bit 0 of a 4-bit input word stored in IR, starting from a bit position selected by the translator TR, and to store the 2-bit position code of the thus found bit 0 in the output register OR.

The bit finder circuit operates as follows when it is for instance assumed that the 4-bit input word stored in the register IR is 0110 and that the 2-bit code applied to the input IN of the translator is 01.

Because the input word is 0110 the outputs S00 and S11 are de-activated (0), whereas the outputs S01 and S10 are activated (1). As a consequence only the change-over contacts I01A, I01B, I10A and I10B are brought in their work position shown, i.e. make contact AB closed. On the other hand, the 2-bit input code 01 applied to the translator TR is translated into the 4-bit position code 0100 as a result of which only the make contacts S01A and S01B are brought in their work position shown. Due to this, the identity bits 1,1 of the 2-bit position code 11 of the first bit 0 of the 4-bit input word 0110 following the selected row are applied to the inputs IA and IB. More particularly, the first bit 1 is applied to IA via the break contact AC of I11A, the make contacts AB of I10A and I01A and the make contact AD of S01A. The second bit 1 is applied to IB in a similar way. Thus the output register OR finally stores the 2-bit position code 11 of the first bit 0 found.

Figure 2:
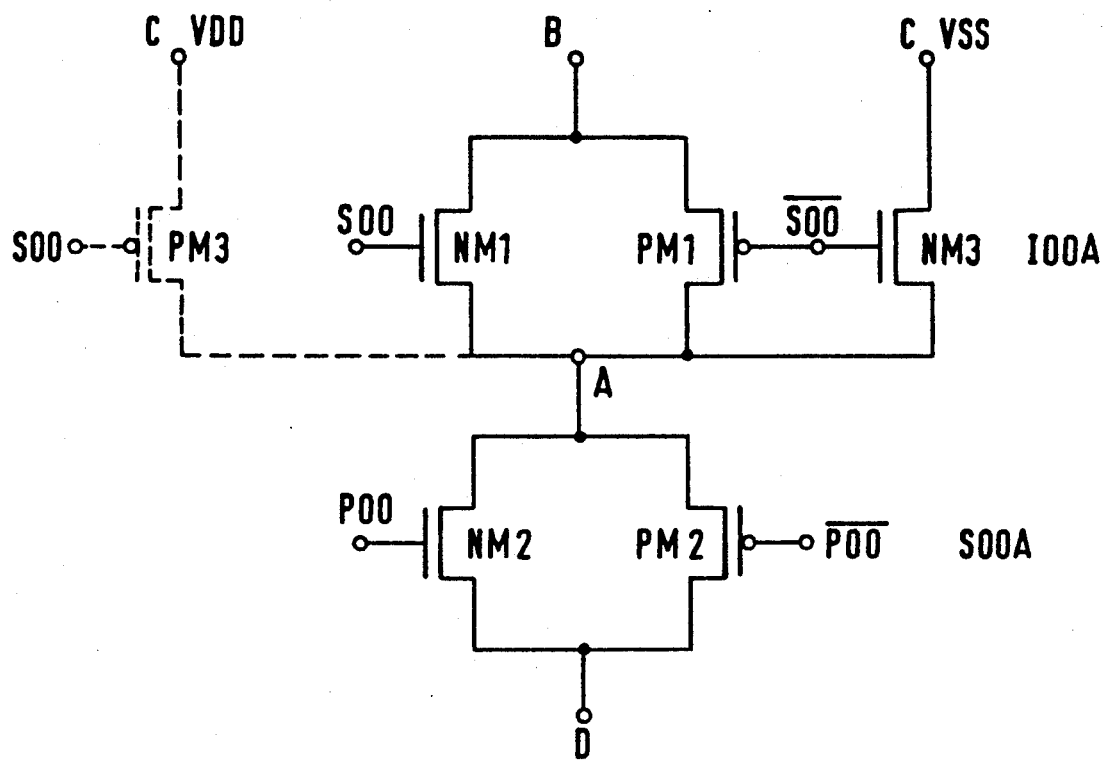
FIG. 2 shows an electronic embodiment of a crosspoint I00A/S00A of FIG. 1 in the rest condition as well as a modification thereof in dashed lines.

Reference is now made to FIG. 2 which shows a practical embodiment of the crosspoint of FIG. 1 comprising the change-over contact I00A and the make contact S00A. The change-over contact I00A includes a make contact AB constituted by a pass-gate which is built up by means of NMOS transistor NM1 and PMOS transistor PM1 controlled by the outputs S00 and S00 (which is the complement of S00 and derived therefrom) respectively. The break contact AC of the contact I00A is constituted by NMOS transistor NM3 controlled by output S00, the terminal C being connected to VSS equal to 0 Volt and representing a binary 0. The make contact S00A is constituted by another pass-gate built up by transistor NM2 and PM2 controlled by the outputs P00 and P00 (which is the complement of P00 and derived therefrom) respectively.

In case the break contact AC of a crosspoint is connected to a bit 1 then NMOS transistor NM3 is substituted by PMOS transistor PM3 controlled by S00 and terminal C is connected to VDD equal to 5 Volts and representing a binary 1.

Instead of rising the transistor switches of FIG. 2 for realizing a crosspoint of FIG. 1 it is also possible to use gates therefor. For instance one could use two AND gates (not shown) whose inputs are constituted by B, S00 and C, S00 respectively and the outputs of which are connected through an OR gate to one input of another AND gate. The other input of this other AND gate is constituted by P00 and its output constitutes the output D.

The above bit finder circuit is for instance useful in a telecommunication switching system wherein a next free channel among a plurality of busy/free channels has to be found from a predetermined channel which is actually being processed onwards. From the above example it follows that when for instance the second channel of four such channels is being actually processed (and is therefore busy) the next free channel to be used is the fourth channel with identity 11.

While the principles of the invention have been described above in connection with specific apparatus, it is to be clearly understood that this description is made only by way of example and not as a limitation on the scope of the invention.

What is claimed is:

1. Bit finder circuit for finding the first bit 0/1 in an m-bit input word from a start bit onwards and in a predetermined direction, the positions of said bits in said m-bit word being defined by an n-bit code, characterized in that it includes a crosspoint matrix of m rows and n columns, each crosspoint including a change-over contact means (ABC), with a make contact means (AB) and a break contact means (AC), and another make contact means (AD) all contact means having a common terminal (A) the rows of change-over contact means (ABC) being controlled by respective bits of said m-bit word and the break contact means (AC) of the change-over contact means (ABC) of each row being coupled to respective bits of the n-bit code identifying the bit of the m-bit word controlling these break contact means, and in that the make contact means (AB) of the change-over contact means (ABC) of a same column are connected in series, whilst said other make contact means (AD) of a same column are connected in parallel to a same output terminal (IA, IB), the rows of said other make contact means being controlled by a single-row selection circuit (TR).

2. Bit finder circuit (FC) according to claim 1, characterized in that the series connected make contact means (AB) of the change-over contact means (ABC) of a same column are connected in a closed loop.

3. Bit finder circuit (FC) according to claim 1, characterized in that the values of the m-bits of said m-bit word are indicative of the free/busy status of respective telecommunication channels in a telecommunication switching network.

4. Bit finder circuit (FC) according to claim 1, characterized in that said single-row selection circuit (TR) includes a translator for translating an n-bit position code into a decimal m-bit position code whose bits control respective ones of said rows of said other make contact means (AD).

* * * * *